US008285767B2

(12) United States Patent
Chandra

(10) Patent No.: US 8,285,767 B2
(45) Date of Patent: Oct. 9, 2012

(54) APPARATUS AND METHOD FOR GENERATING A RANDOM NUMBER

(75) Inventor: Vikas Chandra, Fremont, CA (US)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/064,121

(22) Filed: Mar. 7, 2011

(65) Prior Publication Data

US 2012/0233233 A1    Sep. 13, 2012

(51) Int. Cl.
 *G06F 7/58* (2006.01)
(52) U.S. Cl. .......................................... 708/251
(58) Field of Classification Search .................. None
See application file for complete search history.

(56) References Cited

U.S. PATENT DOCUMENTS

| 7,424,500 | B2 * | 9/2008 | Fukushima et al. | 708/251 |
|---|---|---|---|---|
| 7,852,162 | B2 * | 12/2010 | Gressel et al. | 331/78 |
| 2004/0017235 | A1 | 1/2004 | Hars | |
| 2008/0313249 | A1 * | 12/2008 | Fukushima et al. | 708/251 |
| 2009/0106339 | A1 * | 4/2009 | Vasyltsov et al. | 708/251 |
| 2009/0222502 | A1 * | 9/2009 | Ikegami et al. | 708/251 |
| 2010/0106757 | A1 * | 4/2010 | Matthews et al. | 708/251 |
| 2011/0131263 | A1 * | 6/2011 | Vasyltsov et al. | 708/251 |
| 2011/0302232 | A1 * | 12/2011 | Vasyltsov et al. | 708/251 |

FOREIGN PATENT DOCUMENTS

JP    2010-117846    5/2010

OTHER PUBLICATIONS

Nakura et al., "Ring Oscillator Based Random Number Generator Utilizing Wake-up Time Uncertainty", *IEEE Asian Solid-State Circuits Conference*, Nov. 18, 2009, pp. 121-124.
Bucci et al., "A High-Speed Oscillator-Based Truly Random No. Source for Cryptographic Applications on a Smart Card IC", *IEEE Transactions on Computers*, vol. 52, No. 4, Apr. 2003, pp. 403-409.
Tokunaga et al., "True Random Number Generator With a Mestastability-Based Quality Control", *IEEE Journal of Solid-State Circuits*, vol. 43, No. 1, Jan. 2008, pp. 78-85.
Holcomb et al., "Power-up SRAM State as an Identifying Fingerprint and Source of True Random Numbers", *IEEE Transactions on Computers, to Appear*, No Date, pp. 1-14.
UK Search Report dated Jun. 12, 2012 for GB 1203345.2.

* cited by examiner

*Primary Examiner* — David H Malzahn
(74) *Attorney, Agent, or Firm* — Nixon & Vanderhye P.C.

(57) ABSTRACT

An apparatus and method for generating a random number are provided, the apparatus having at least one generator circuit, each generator circuit being configured to provide a first operating mode and a second operating mode, in the first operating mode each generator circuit operating as an oscillator, and in the second operating mode each generator circuit operating as a state retention element. A control signal generator then generates a control signal for input to each generator circuit. Each generator circuit is responsive to the input control signal being at a set level to operate in the first operating mode, and is responsive to the input control signal being at a clear level to operate in the second operating mode. On a transition of the input control signal from the set level to the clear level, each generator circuit is configured to capture within the state retention element a current value of the oscillator, and to output that current value to form at least part of the random number. Such an approach provides a particularly simple, efficient and low area apparatus for generating a random number.

13 Claims, 4 Drawing Sheets

APPARATUS AND METHOD FOR GENERATING A RANDOM NUMBER

BACKGROUND OF THE INVENTION

1. Field of the Invention

The present invention relates to an apparatus and method for generating a random number.

2. Description of the Prior Art

Random number generators are essential components for a wide range of applications. In security systems they provide the secret keys or tokens for authentication and encryption. They are also applied to various problems in simulation software.

For such applications, it is a key requirement to provide a high quality random number source. A true random number is a collection of bits that are unpredictable and show statistical properties of randomness.

A number of hardware techniques have been developed for generating random numbers, such techniques typically using a physical source of randomness within a data processing apparatus. Such circuits are often referred to as True Random Number Generators (TRNGs).

As an example of such a TRNG circuit, the article "True Random Number Generator with a Metastability-Based Quality Control" by C Tokunaga et al, IEEE Journal of Solid-State Circuits, Volume 43, No. 1, January 2008, pages 78-85, describes a design of TRNG that uses a latch placed into a metastable state, i.e. where its stored state is indeterminate, lying between a logic zero and a logic one level. Over time, such a latch placed in a metastable state will resolve to either a logic zero value or a logic one value, with noise contributing to the direction in which the latch resolves. The circuit described in this paper monitors the time taken to resolve to a known value within the latch, this time being unknown and effectively random. That resolving time is then converted into a random number.

The article "A High-Speed Oscillator-Based Truly Random Number Source for Cryptographic Applications on a Smart Card IC" by M Bucci et al, IEEE Transactions on Computers, Volume 52, No. 4, April 2003, describes an oscillator-based random number generator, where a low frequency oscillator samples a fast oscillator in a D flip-flop. If the low frequency oscillator period features a standard deviation much greater than the faster oscillator period, the states of the sampled oscillator in two successive sampling times can be assumed uncorrelated (i.e. independent), thus generating a random bit stream. The oscillator described in the article is provided with an amplified noise source, yielding a standard deviation of about 10% of the period length. Such a high jitter level improves the quality of the random stream.

The article "Ring Oscillator Based Random Number Generator Utilizing Wake-Up Time Uncertainty" by T Nakura et al, IEEE Asian Solid-State Circuits Conference, Nov. 16-18, 2009, Taipei, Taiwan, pages 121-124, describes a random number generation circuit that utilises a ring oscillator's wake-up time uncertainty to generate a random number. In particular, a ring oscillator goes into metastability state before starting to oscillate when its control voltage is increased from zero. The metastability causes an uncertainty in the wake-up time of the ring oscillator resulting in large jitter, which is then used for random number generation.

The article "Power-Up SRAM State as an Identifying Fingerprint and Source of True Random Numbers" by D Holcomb et al, IEEE Transactions on Computers, Volume 58, No. 9, September 2009, pages 1198-1210, describes a technique which uses the initial state of an SRAM as a source of a random number. However, one problem with this approach is that the skew due to process variation will always be present, and hence whilst such an approach may be good for generating deterministic chip identifiers, it is less good for random number generation, since successive generation of the random number will be more or less identical.

All of the various prior art random number generators described above are relatively complex and occupy a significant area, making them impractical for many implementations. Further, to the extent they include analog circuits, they will give rise to layout constraints, and may not be readily portable between different process geometries. Hence, as process geometries shrink, and the individual components hence get smaller, such techniques would require at least a degree of redesign to enable them to be applied to such new process geometries.

Accordingly, it would be desirable to provide an improved mechanism for generating true random numbers.

SUMMARY OF THE INVENTION

Viewed from a first aspect, the present invention provides an apparatus for generating a random number, comprising: at least one generator circuit, each said at least one generator circuit being configured to provide a first operating mode and a second operating mode, in the first operating mode each said at least one generator circuit operating as an oscillator, and in the second operating mode each said at least one generator circuit operating as a state retention element; a control signal generator for generating a control signal for input to each said at least one generator circuit; each said at least one generator circuit being responsive to the input control signal being at a set level to operate in the first operating mode, and being responsive to the input control signal being at a clear level to operate in the second operating mode, on a transition of the input control signal from said set level to said clear level each said at least one generator circuit being configured to capture within the state retention element a current value of the oscillator, and to output that current value to form at least part of the random number.

In accordance with the present invention, a number of generator circuits are provided, each generator circuit being able to operate as either an oscillator or as a state retention element dependent on the value of a control signal input to that generator circuit. When the control signal is set (e.g. at a logic 1 level), each generator circuit operates as an oscillator, and when the control signal is clear (e.g. at a logic 0 level), each generator circuit captures within the state retention element a current value of the oscillator and outputs that value to form at least part of the random number. The apparatus of the present invention hence provides a very simple and efficient mechanism for generating random numbers, the apparatus being significantly less complex than known prior art random number generators, and occupying a relatively small area, thus providing a practical solution for a wide variety of different applications.

Since the control signal determines both how long each generator circuit operates as an oscillator, and also when the current state of the oscillator is captured to output as at least part of the random number, timing jitter that will inherently be present in the transitions of the control signal ensures that the output from each generator circuit is random. Further, since the same component, i.e. each generator circuit, forms both the noise source (the oscillator) and the sampler (the state retention element), the entropy observed within the apparatus is significantly higher than in known prior art techniques, higher entropy indicating a higher degree of randomness in the output.

In one embodiment, timing jitter in the transitions of the control signal is not the only source of randomness in the output, and in addition each generator circuit operates from a supply voltage, with noise in the supply voltage altering the frequency of oscillation of the oscillator in a random manner. Accordingly the timing jitter in the control signal and the supply voltage noise (also referred to herein as supply voltage ripple) operate together within the design to cause the apparatus to generate random numbers with good entropy.

The control signal generator can be arranged to generate the control signal in a variety of ways. However, in one embodiment, the control signal generator is configured to generate the control signal as a pulse, so that the set level is provided for the duration of said pulse, and timing jitter in said pulse affects the period for which each said at least one generator circuit operates as said oscillator, and a time at which the current value of the oscillator is captured within the state retention element. In such embodiments, the pulse can be generated whenever it is desired to output a random number, and between each occurrence of the pulse, each generator circuit will continue to output the value that was captured at the time the control signal last transitioned from the set state to the clear state (i.e. at the end of the previous pulse).

Each generator circuit can be constructed in a variety of ways. However, in one embodiment the oscillator comprises a plurality of oscillator stages formed as a loop, said plurality being an odd number. Further, each generator circuit is configured to be responsive to the control signal being at said clear level to bypass a subset of the oscillator stages, the subset containing an odd number of oscillator stages, such that the remaining even number of oscillator stages operate as the state retention element. This provides a particularly simple and efficient mechanism for switching each generator circuit between operation as an oscillator and operation as a state retention element.

The various oscillator stages can be implemented in a variety of ways. However, in one embodiment, each oscillator stage comprises an inverter circuit.

There are a number of ways in which each generator circuit can be arranged to bypass a subset of the oscillator stages when in the second operating mode. However, in one embodiment, each generator circuit further comprises a multiplexer inserted into the loop, the multiplexer being configured to receive the control signal, such that when the control signal is set the loop is maintained, and when the control signal is clear the multiplexer creates a sub-loop by bypassing said subset of oscillator stages. Use of a multiplexer in such a manner provides a simple mechanism for bypassing a subset of the oscillator stages when in the second operating mode.

The number of oscillator stages provided within the oscillator is a matter of design choice. However, it will generally be desirable for the oscillator to oscillate at a high frequency, and accordingly a relatively low number of oscillator stages will help achieve this. Further, a small number of oscillator stages will also keep the circuit small. In one particular embodiment, the plurality of oscillator stages comprises three oscillator stages, and the subset of said oscillator stages comprises a single oscillator stage. Hence, in such embodiments, there will be three oscillator stages within each generator circuit when that generator circuit is operating as an oscillator, and then when that generator circuit is operating as a state retention element, the sub-loop will contain only two oscillator stages, in effect turning the generator circuit into a latch.

In one embodiment, each generator circuit outputs a single bit which can be used to form part of a random number. Accordingly, in one embodiment the apparatus comprises a plurality of generator circuits, each constructed as described above, and the current value output by each generator circuit when operating in the second operating mode forms a different bit of a multi-bit random number. This provides a very scalable solution, since the generator circuit merely needs to be replicated as required to provide the size of random number required for any particular implementation.

Further, the presence of a plurality of generator circuits, with each generator circuit producing a single bit of the random number, can itself serve to increase the randomness of the random number generated. In particular, in one embodiment, the control signal generator is configured to output the control signal to the plurality of generator circuits over a dissemination path, the dissemination path being configured so that transitions in the value of the control signal are observed at non-identical times by the plurality of generator circuits. Accordingly, not only does timing jitter affect both the length of operation of the oscillator within each generator circuit, and also the timing at which an output of the oscillator is latched, but in addition the different times at which the control signal is received by the various generator circuits further randomises the timing jitter experienced by any particular generator circuit. In addition, since the absolute time at which each generator circuit operates as an oscillator is slightly different, the supply voltage ripple experienced by each individual generator circuit also differs.

There are a number of ways in which the dissemination path can be configured so that transitions in the value of the control, signal are observed at non-identical times by the plurality of generator circuits. In one embodiment, the dissemination path comprises a series of buffer elements serving to delay propagation of the control signal along the dissemination path, and each of the generator circuits receives the control signal from an associated location along the dissemination path, the associated location being different for different generator circuits.

In an alternative embodiment, or in addition, the plurality of generator circuits are placed at different locations within a data processing apparatus, such that the length of the dissemination path for each generator circuit is dependent on the location of that generator circuit. By placing the plurality of generator circuits at different locations within the apparatus, this means that the environmental conditions experienced by the various generator circuits varies dependent on their location within the apparatus, which again introduces a degree of randomness into the operation of each generator circuit.

Viewed from a second aspect, the present invention provides a method of operating an apparatus to generate a random number, comprising: providing at least one generator circuit; configuring each said at least one generator circuit to provide a first operating mode and a second operating mode, in the first operating mode each said at least one generator circuit operating as an oscillator, and in the second operating mode each said at least one generator circuit operating as a state retention element; generating a control signal for input to each said at least one generator circuit; operating each said at least one generator circuit in the first operating mode in response to the input control signal being at a set level, and operating each said at least one generator circuit in the second operating mode in response to the input control signal being at a clear level; within each said at least one generator circuit, on a transition of the input control signal from said set level to said clear level, capturing within the state retention element a current value of the oscillator, and outputting that current value to form at least part of the random number.

Viewed from a third aspect, the present invention provides an apparatus for generating a random number, comprising: at least one generator means, each said at least one generator means for providing a first operating mode and a second operating mode, in the first operating mode each said at least one generator means for operating as an oscillator means, and in the second operating mode each said at least one generator means for operating as a state retention means; a control signal generation means for generating a control signal for input to each said at least one generator means; each said at least one generator means for operating in the first operating mode in response to the input control signal being at a set level, and for operating in the second, operating mode in response to the input control signal being at a clear level, on a transition of the input control signal from said set level to said clear level each said at least one generator means for capturing within the state retention means a current value of the oscillator means, and for outputting that current value to form at least part of the random number.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
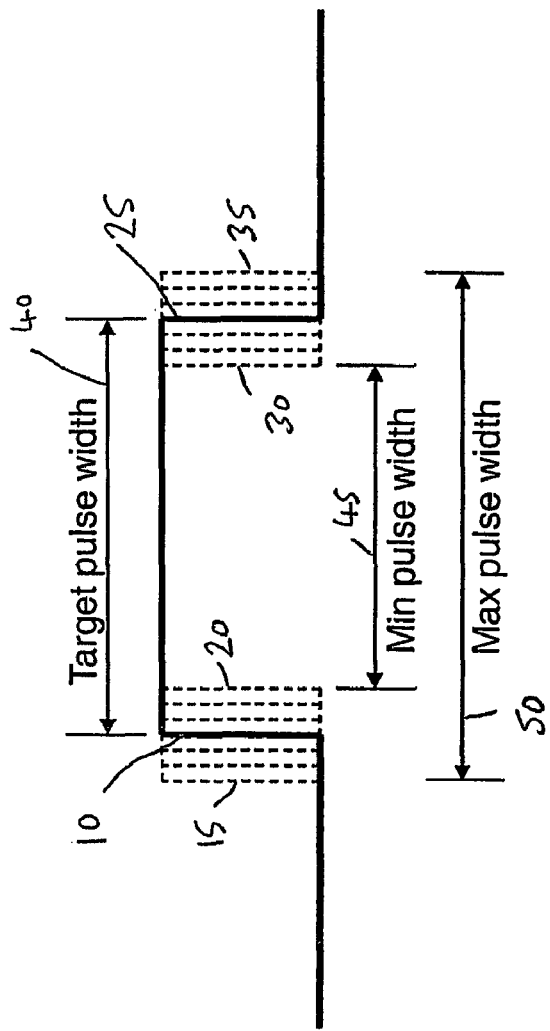
FIG. 1 is a diagram illustrating timing jitter.
Figure 2:
FIG. 2 is a diagram illustrating supply voltage ripple noise.

Before describing an embodiment of the present invention, two sources of uncertainty in digital design will be described with reference to FIGS. 1 and 2, FIG. 1 illustrating timing jitter and FIG. 2 illustrating supply voltage ripple.

Timing jitter is defined as the time variation of a periodic signal. As an example, if a global clock signal is distributed, there is some uncertainty as to exactly when the clock edges will appear. There are many underlying reasons for jitter, and the most important of those are random noise sources in electronic circuits. As shown in FIG. 1, whilst in an ideal case a signal may transition from the logic zero to the logic one level at the timing illustrated by the vertical transition 10 in FIG. 1, the timing of that edge may in fact vary between point 15 and point 20 in FIG. 1. Similarly, the transition from the logic one level to the logic zero level might ideally occur at the vertical transition indicated by the numeral 25 in FIG. 1, but in fact may occur any time betweens points 30 and 35. As a result whilst there may be a target pulse width 40 for the signal, the width of a distributed pulse may range from the minimum pulse width 45 to the maximum pulse width 50, and anything in between. Due to these variations it is almost impossible to control the pulse width beyond a reasonable limit. In the following embodiments, this uncertainty is used in a beneficial way to generate random bit patterns.

In addition to timing jitter, supply voltage noise (also referred to herein as supply voltage ripple) also provides a source of uncertainty in digital designs. Supply voltage noise is the transient noise on the supply voltage which exists due to various reasons, including charge injection, coupling, etc. Hence, whilst the supply voltage will ideally be at the level 60 shown in FIG. 2, noise will cause the level to vary over time, as shown by the dotted line 70. In reality, it is common to observe peak-to-peak ripple noise of up to 10 to 25 mV for a 1V supply.

In the embodiments described below, the ever increasing uncertainty in timing (mainly jitter) and supply voltage ripple are harnessed in order to generate a random bit. The design used in one embodiment to generate one random bit is shown schematically in FIG. 3. The generator circuit 100 used to generate a single random bit is configured to provide both a first operating mode and a second operating mode, with the mode selected being dependent on the value of the select signal provided as a control signal over path 130. In particular, the select signal is used to control a multiplexer 120 inserted into a loop comprising a number of inverter circuits 105, 110, 115. When the select signal is set (in the embodiment illustrated in FIG. 3 the signal being set to a logic one value), it will be appreciated that the inverter elements 105, 110, 115 form a loop of oscillator stages and the circuit 100 then acts as an oscillator, with the signal observed on the path 140 varying as a function of the frequency with which a signal passes around the loop.

However, when the select signal transitions to a clear level (in this example a logic zero level), then the multiplexer 120 selects its other input, thus creating a sub-loop consisting of solely the inverter elements 105 and 110, the inverter element 115 being excluded from the newly formed sub-loop. At this point, the inverter elements 105, 110 form a latch, and accordingly the output observed at path 140 becomes static, remaining at the value present at the time the select signal transitioned from the set state to the clear state.

In one embodiment, the select signal is provided as a pulse, so that when generation of a random bit is required, a pulse is asserted, causing the select signal to transition from the clear level to the set level, and then after a period of time to transition back to the clear level. Due to timing jitter as discussed earlier with reference to FIG. 1, the exact width of the pulse will vary, and accordingly the amount of time that the circuit 100 operates as an oscillator will vary dependent on the timing jitter. In addition, the actual point at which the circuit stops being an oscillator, and becomes a state retention element, will also vary dependent on the timing jitter. Furthermore, supply voltage ripple noise as discussed earlier with reference to FIG. 2 will vary the frequency of the oscillation, since each of the inverter elements 105, 110, 115 will be driven by the supply voltage and any noise in that supply voltage will alter their speed of operation. As a result, the value output over path 140 when the pulse is de-asserted will be random.

Figure 3:
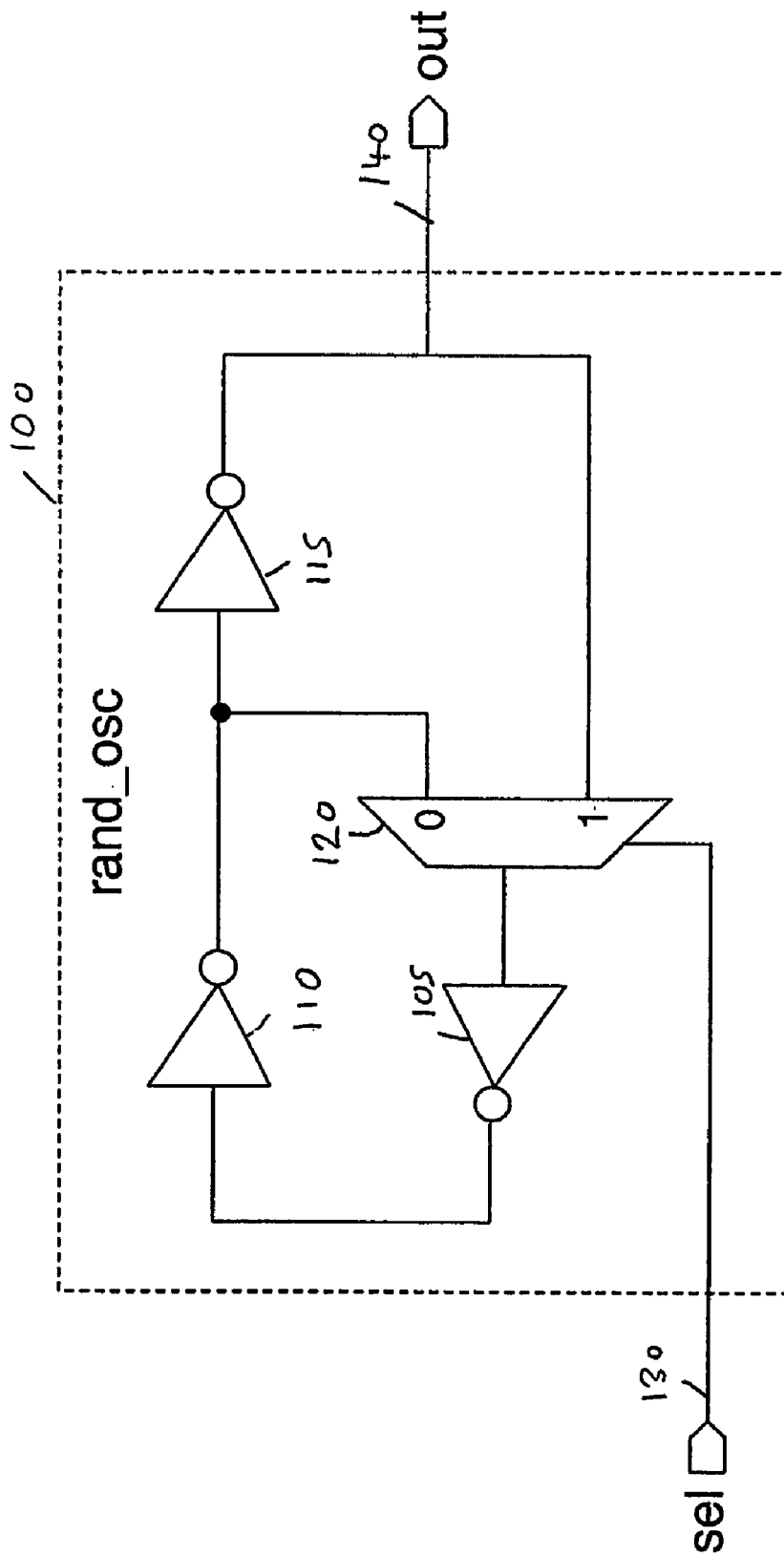
FIG. 3 illustrates a cell structure used as a random bit generator circuit in accordance with one embodiment.

Whilst in FIG. 3 three inverter elements 105, 110, 115 are shown, the exact number of oscillator stages provided within the loop can be varied as a matter of design choice, provided that an odd number of oscillator stages are provided to ensure that in the first operating mode the circuit 100 acts as an oscillator. Further, the exact number of oscillator stages bypassed when the select signal is cleared can also be varied, provided that an odd number of stages are bypassed, so that an even number of stages are then contained within the sub-loop once the circuit 100 has been placed into the second operating mode.

Figure 4:
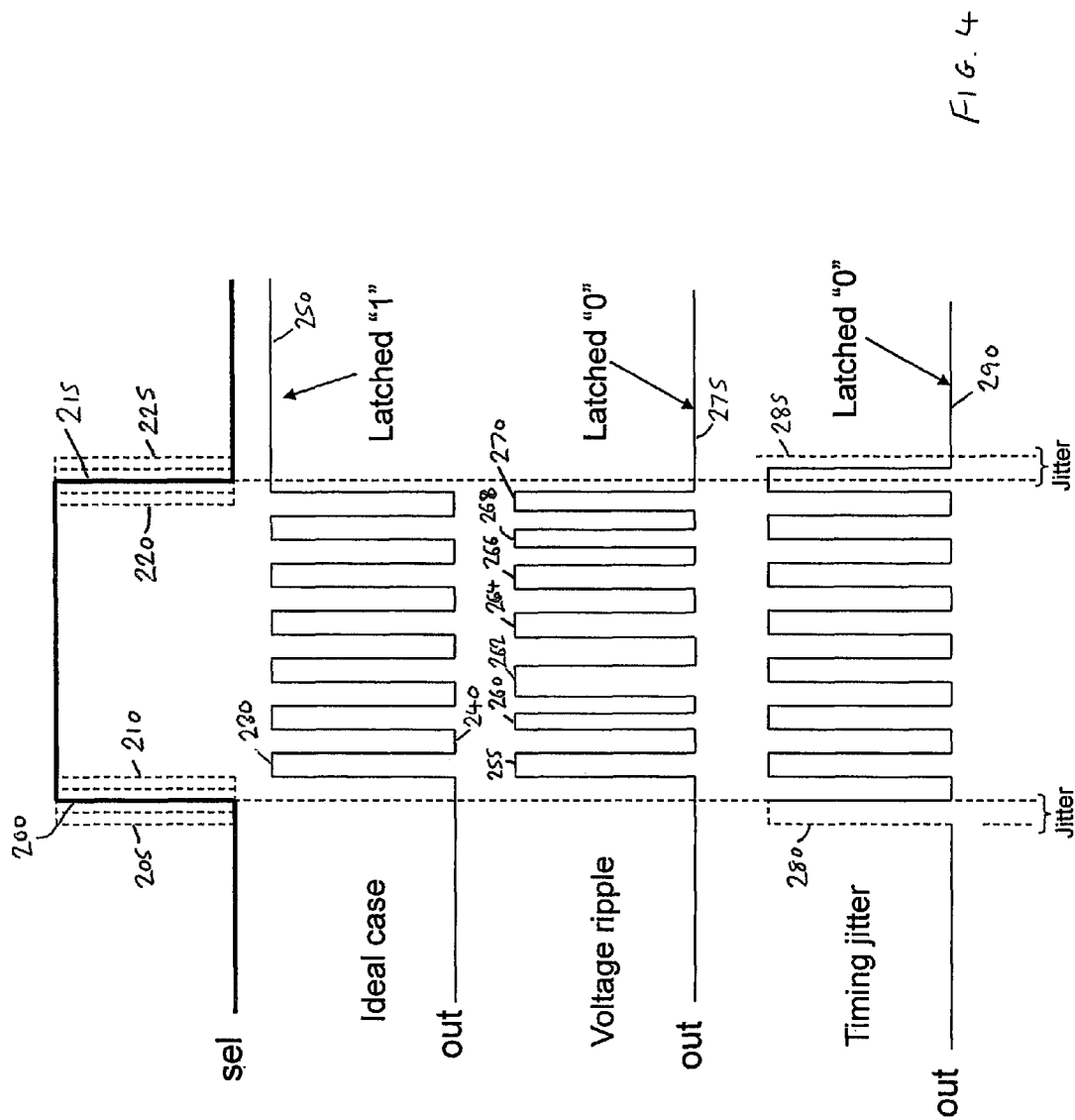
FIG. 4 is a diagram illustrating how voltage ripple and timing jitter affect the value latched by the circuit of FIG. 3 in accordance with one embodiment.

FIG. 4 schematically illustrates how voltage ripple and timing jitter may affect the value latched by the circuit 100 when the pulse is de-asserted. Firstly, the ideal case is shown where the select signal transitions to the set state at point 200 and then transitions back to the clear state at step 215. It is also assumed that a constant voltage supply is provided to the circuit, so that the width of the alternate oscillating values 230, 240 are the same. In this ideal case, it will be seen that the latched value is a logic one level as shown by line 250. With reference to FIG. 3, this in practice will mean that a logic zero value is provided as the upper input to the multiplexer 120 at the time of the transition 215, causing the output over path 140 to be at the logic one level 250.

Below the ideal case in FIG. 4, the effect of voltage ripple is shown. Again, it assumed that the select signal transitions to the set state at timing 200 and transitions back to the clear state at timing 215. However, noise on the voltage supply line affects the frequency of the oscillation so that the duration of the various oscillation peaks 255, 260, 262, 264, 266, 268, 270 varies. As a result, in this example, a logic zero value is latched at the time 215, as represented by the output line 275.

Hence, depending on the amount of noise, the voltage ripple noise can directly lead to latching of a different value even in the absence of timing jitter.

The lower diagram of FIG. 4 shows the effect of timing jitter, which can affect both the transition to the set state of the select signal and/or the transition to the clear state at the end of the pulse. The lower figure of FIG. 4 illustrates an example where the select signal is asserted to the set state at the timing 280, i.e. slightly earlier than the ideal case, and as a result the oscillator starts to oscillate earlier than expected. In addition, for completeness, the diagram also shows some jitter occurring when the pulse is de-asserted, it being assumed that the pulse is de-asserted at timing 285. Again, in this example, this leads to a logic zero value being output, as indicated by the line 290.

Although for simplicity FIG. 4 shows voltage ripple and timing jitter occurring independently, in real systems both voltage ripple and timing jitter will occur simultaneously, and hence will add substantive uncertainty to the value which will finally end up being output from the circuit 100 when the select signal is cleared to the logic zero value. This scheme, albeit simple, provides a powerful and low-cost method to generate a random output bit.

Figure 5:
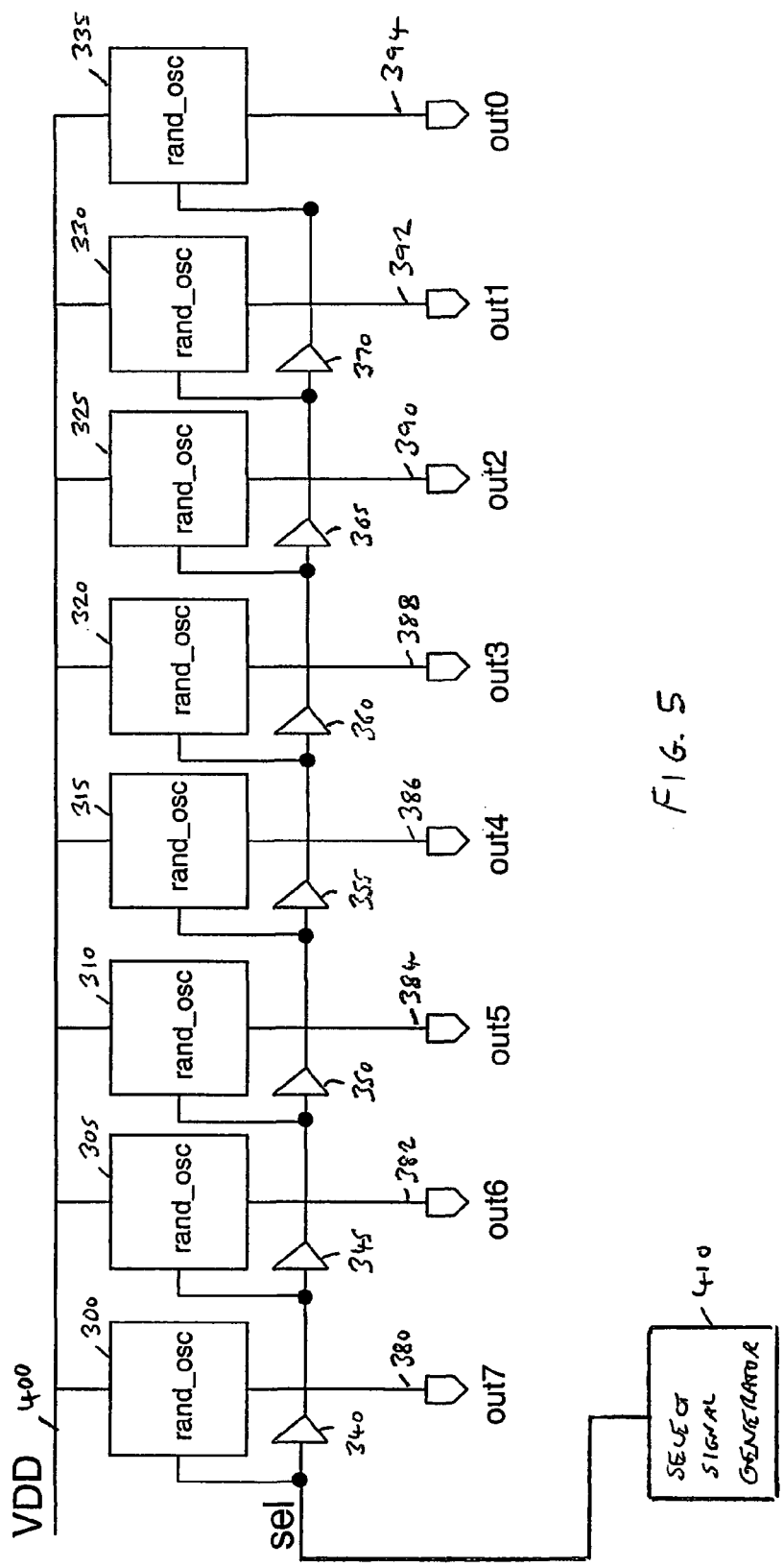
FIG. 5 is a diagram illustrating how multiple instances of the circuit of FIG. 3 can be combined to generate a multi-bit random number in accordance with one embodiment.

In many systems, there will be a desire to generate a multi-bit random number, and this can readily be achieved using the cell structure of FIG. 3 by merely replicating that cell structure the required number of times, with each instance of the cell structure producing one bit of the random number. This is shown schematically in FIG. 5 for an example where an 8-bit random number is generated. Accordingly, eight instances 300, 305, 310, 315, 320, 325, 330 and 335 of the oscillator circuit of FIG. 3 are provided, each circuit operating from the same supply voltage 400. The select signal is generated by select signal generator 410 and distributed over a dissemination path to each of the random bit generator circuits.

In this example, a series of buffer circuits 340, 345, 350, 355, 360, 365, 370 are used to ensure that the timing of receipt of the pulse generated by the select signal generator 410 varies between the different random bit generator circuits. This ensures that the jitter is maximised due to random noise sources in each buffer and also that the jitter in the select signal input to each random bit generator circuit is not correlated. Each random bit generator is then subjected to different timing jitter, and also to different supply voltage ripple noise during the period it is operating as an oscillator, ensuring that the output of each bit generator is random and uncorrelated with the output of any of the other random bit generators. Hence, an 8-bit random number is created by the signals output over paths 380, 382, 384, 386, 388, 390, 392 and 394.

Such embodiments provide a particularly simple and effective mechanism for generating random numbers within a data processing apparatus such as an integrated circuit. Since the design is simple and low cost (area wise), as well as being readily scalable for different sizes of random numbers, it can be used in a wide variety of applications.

Since each bit of the random number is generated by a separate random bit generator circuit such as shown in FIG. 3, those individual random bit generator circuits can be distributed as desired throughout the integrated circuit. Indeed, if steps are taken to distribute the individual random bit generators widely throughout the integrated circuit, then those different random bit generator circuits will be exposed to different environmental conditions and will naturally experience different timing jitter and different supply voltage ripple, thereby further improving the randomness of the numbers generated.

In accordance with the above described embodiments, the same circuit is used to provide both a noise source (oscillator) and the sampler (state retention element). In addition to providing a particularly simple and small area circuit, this approach also improves the entropy of the system when compared with known prior art approaches, providing improved randomness in the outputs relative to known prior art circuits.

In the above described embodiments, the entropy of the random number is a function of supply noise and timing jitter, and as such it would be very difficult for someone to implement a side channel attack on such an apparatus. Indeed it is expected that any side channel attack would further improve the entropy, thus creating more randomness in the random number generation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. An apparatus for generating a random number, comprising:
   at least one generator circuit, each said at least one generator circuit being configured to provide a first operating mode and a second operating mode, in the first operating mode each said at least one generator circuit operating as an oscillator, and in the second operating mode each said at least one generator circuit operating as a state retention element;
   a control signal generator for generating a control signal for input to each said at least one generator circuit;
   each said at least one generator circuit being responsive to the input control signal being at a set level to operate in the first operating mode, and being responsive to the input control signal being at a clear level to operate in the second operating mode, on a transition of the input control signal from said set level to said clear level each said at least one generator circuit being configured to capture within the state retention element a current value of the oscillator, and to output that current value to form at least part of the random number.

2. Apparatus as claimed in claim 1, wherein:
   the control signal generator is configured to generate the control signal as a pulse, so that the set level is provided for the duration of said pulse, and timing jitter in said pulse affects the period for which each said at least one generator circuit operates as said oscillator, and a time at which the current value of the oscillator is captured within the state retention element.

3. Apparatus as claimed in claim 1, wherein each said at least one generator circuit operates from a supply voltage, and noise in the supply voltage alters a frequency of oscillation of the oscillator.

4. Apparatus as claimed in claim 1, wherein:
said oscillator comprises a plurality of oscillator stages formed as a loop, said plurality being an odd number; and
each said at least one generator circuit is configured to be responsive to the control signal being at said clear level to bypass a subset of said oscillator stages, the subset containing an odd number of oscillator stages, such that the remaining even number of oscillator stages operate as said state retention element.

5. Apparatus as claimed in claim 4, wherein each oscillator stage comprises an inverter circuit.

6. Apparatus as claimed in claim 4, wherein each said at least one generator circuit further comprises a multiplexer inserted into said loop, said multiplexer configured to receive the control signal, such that when the control signal is set said loop is maintained, and when the control signal is clear the multiplexer creates a sub-loop by bypassing said subset of said oscillator stages.

7. Apparatus as claimed in claim 4, wherein said plurality of oscillator stages comprises three oscillator stages and said subset of said oscillator stages comprises a single oscillator stage.

8. Apparatus as claimed in claim 1, wherein:
said at least one generator circuit comprises a plurality of generator circuits; and
the current value output by each generator circuit when operating in said second operating mode forms a different bit of a multi-bit random number.

9. Apparatus as claimed in claim 8, wherein the control signal generator is configured to output the control signal to said plurality of generator circuits over a dissemination path, the dissemination path being configured so that transitions in the value of the control signal are observed at non-identical times by said plurality of generator circuits.

10. Apparatus as claimed in claim 9, wherein said dissemination path comprises a series of buffer elements serving to delay propagation of the control signal along the dissemination path, and each of said generator circuits receives the control signal from an associated location along the dissemination path, the associated location being different for different generator circuits.

11. Apparatus as claimed in claim 9, wherein the plurality of generator circuits are placed at different locations within a data processing apparatus, such that the length of the dissemination path for each generator circuit is dependent on the location of that generator circuit.

12. A method of operating an apparatus to generate a random number, comprising:
providing at least one generator circuit;
configuring each said at least one generator circuit to provide a first operating mode and a second operating mode, in the first operating mode each said at least one generator circuit operating as an oscillator, and in the second operating mode each said at least one generator circuit operating as a state retention element;
generating a control signal for input to each said at least one generator circuit;
operating each said at least one generator circuit in the first operating mode in response to the input control signal being at a set level, and operating each said at least one generator circuit in the second operating mode in response to the input control signal being at a clear level;
within each said at least one generator circuit, on a transition of the input control signal from said set level to said clear level, capturing within the state retention element a current value of the oscillator, and outputting that current value to form at least part of the random number.

13. An apparatus for generating a random number, comprising:
at least one generator means, each said at least one generator means for providing a first operating mode and a second operating mode, in the first operating mode each said at least one generator means for operating as an oscillator means, and in the second operating mode each said at least one generator means for operating as a state retention means;
a control signal generation means for generating a control signal for input to each said at least one generator means;
each said at least one generator means for operating in the first operating mode in response to the input control signal being at a set level, and for operating in the second operating mode in response to the input control signal being at a clear level, on a transition of the input control signal from said set level to said clear level each said at least one generator means for capturing within the state retention means, a current value of the oscillator means, and for outputting that current value to form at least part of the random number.

* * * * *